United States Patent [19]

Tanaka et al.

[11] 4,343,022
[45] Aug. 3, 1982

[54] APPARATUS FOR PRODUCING A PHASE-SYNCHRONIZED REFERENCE SIGNAL IN A VIDEO SIGNAL REPRODUCING SYSTEM

[75] Inventors: Shosuke Tanaka; Mitsushige Tatami, both of Tokyo, Japan

[73] Assignee: Sony Corporation, Tokyo, Japan

[21] Appl. No.: 166,894

[22] Filed: Jul. 8, 1980

[30] Foreign Application Priority Data

Jul. 18, 1979 [JP] Japan .................................. 54-91074

[51] Int. Cl.$^3$ ............................................ H04N 5/795
[52] U.S. Cl. ..................................... 360/36; 360/64; 360/10
[58] Field of Search ................... 360/9, 10, 36, 37, 70, 360/61, 64; 358/4, 8, 127

[56] References Cited

U.S. PATENT DOCUMENTS

| | | | |
|---|---|---|---|
| 4,178,607 | 12/1979 | Mikado | 360/36 X |
| 4,203,076 | 5/1980 | Yamashita | 360/36 X |
| 4,257,073 | 3/1981 | Tatami | 360/10 |
| 4,259,698 | 3/1981 | Takada | 360/70 |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

Apparatus is disclosed for use in a video signal reproducing system of the type having first and second rotary reproducing transducers for reproducing video and vertical synchronizing signals from record tracks on a record medium, in which the transducers exhibit a predetermined angular separation therebetween, the video signal reproducing system also having means for producing a reference synchronizing signal in phase synchronism with the vertical synchronizing signal reproduced by the first transducer. The apparatus is adapted to produce a substantially phase synchronized reference signal regardless of the particular transducer which is used to reproduce the video signals. The apparatus comprises a delay circuit for delaying the reference synchronizing signal by an amount corresponding to the predetermined angular separation between the transducers; and a switching circuit supplied with this delayed as well as the undelayed reference synchronizing signal. A switch control circuit supplies a switch control signal to the switching circuit to determine whether the delayed or undelayed reference synchronizing signal should be selected, the switch control circuit including a detector for detecting the phase relationship between the vertical synchronizing signal which then is being reproduced and the reference synchronizing signal.

13 Claims, 18 Drawing Figures

FIG.4E (REF-V)

FIG.4F (MM3-$\bar{Q}$)

APPARATUS FOR PRODUCING A PHASE-SYNCHRONIZED REFERENCE SIGNAL IN A VIDEO SIGNAL REPRODUCING SYSTEM

BACKGROUND OF THE INVENTION

This invention relates to video signal reproducing systems, such as a VTR playback device, having at least two different reproducing heads and, more particularly, to apparatus for use with such a system wherein a reference synchronizing signal is phase-synchronized with the video signals which are reproduced by either head.

When a video tape recorder (VTR) is used in a reproducing mode, the video signals which are reproduced thereby may be supplied to a time base corrector to correct time base errors which may appear in the reproduced video signals. These time base errors, which are frequency and/or phase errors, may be attributed to expansion or contraction in the record medium after the video signals have been recorded thereon, or a variation in the speed at which the record medium is transported during the playback mode relative to the recording mode, or a change in the speed at which the playback heads scan the record medium. In a typical time base corrector, the reproduced video signals are written into a memory device at a rate which is synchronized with the time base errors, and these stored video signals subsequently are read out of the memory device at a relatively fixed, constant rate, thus eliminating such time base errors. Typically, the operation of the time base corrector, such as the starting time at which, for example, the first line of stored video signals is read out therefrom, is synchronized with the operation of the VTR. That is, a reference synchronizing signal, which is produced during the operation of the VTR, is supplied to the time base corrector to effect such synchronization of the latter.

In a helical scan type VTR, a rotary magnetic head, referred to as the main head, generally is used for both recording and reproducing video signals on helically-wrapped magnetic tape. In general, another rotary head is used to monitor the video signals which are recorded on the magnetic tape, and this monitoring head also may be used in a general reproducing mode of operation. Also, a so-called dynamic tracking rotary head may be provided for the purpose of reproducing the video signals from the record tracks during normal or special effects reproducing modes. The dynamic tracking head is supported on a displaceable member, such as a bimorph assembly, this member being responsive to drive signals to be displaced in a direction which is generally transverse of the longitudinal direction of the record tracks. Thus, in the event that the dynamic tracking head does not normally coincide precisely with the record track which it scans, control over the displaceable member brings the head into proper coinciding relationship. The dynamic tracking head finds substantial advantage during special effects modes of operation, such as slow motion, fast motion, stop motion, and the like.

The aforementioned additional reproducing heads, that is, the monitor and dynamic tracking heads, generally are spaced-apart from the main head. During the normal rotary motion of these heads, the monitor and dynamic tracking heads may exhibit an angular displacement from the main head on the order of about 120°. That is, the monitor and dynamic tracking heads exhibit a rotary phase displacement of 120° with respect to the main head.

As is conventional, when video signals are recorded on, for example, magnetic tape in skewed tracks thereacross, a longitudinal control track also is recorded, this control track containing control pulses which are derived from the vertical synchronizing signal included in the video signal. During signal reproduction, these control pulses are reproduced and used in a servo system to control the scanning of the rotary head (or heads) across the tape. A head position pulse generator usually is provided to generate a position pulse whenever the head (or heads) rotates into a predetermined position. These head position pulses are compared with the control pulses which are reproduced from the control track to insure that the rotation of the head (or heads) and the movement of the tape are synchronized. The reproduced control pulses, or the head position pulses, or yet other pulses which are derived from these, are used as so-called reference synchronizing pulses for controlling, or synchronizing the operation of the time base corrector.

Such reference synchronizing pulses generally are in phase synchronism with the vertical synchronizing signal which is reproduced by the main reproducing head of the VTR. That is, when the main reproducing head is used to reproduce the video signals from the magnetic tape, time base correction of such reproduced video signals proceeds properly in response to the aforementioned reference synchronizing signal. However, when the monitor or dynamic tracking head is used to reproduce the video signals, the aforementioned phase synchronism between the reference synchronizing signal and the reproduced vertical synchronizing signal no longer obtains. That is, since the monitor or dynamic tracking head exhibits a phase displacement (on the order of about 120°) with respect to the main head, the vertical synchronizing signal which is reproduced by this monitor or dynamic tracking head likewise exhibits a smaller phase displacement with respect to the reference synchronizing signal. Consequently, if this reference synchronizing signal is not phase-adjusted, time base correction of the video signals which are reproduced by the monitor or dynamic tracking head will not be in synchronism. Thus, operation of the time base corrector will not proceed satisfactorily. As a result thereof, the video picture which ultimately is reproduced from these video signals will be degraded.

To avoid the aforenoted difficulty, the reference synchronizing signal is supplied, substantially as-is, to one input of a selecting circuit, and also is supplied through a delay circuit to another input of this selecting circuit. The delay imparted by the delay circuit corresponds to the angular displacement (e.g. 120°) of the monitor or dynamic tracking head from the main head. When the main head is used to reproduce the video signals from the magnetic tape, the undelayed reference synchronizing signal is selected to be supplied to the time base corrector. When the monitor or dynamic tracking head is used to reproduce the video signals, the delayed version of the reference synchronizing signal is selected. Typically, the selecting circuit is a change-over switch, and a change-over control signal is produced as a function of the particular head which is selected for signal reproduction. This change-over control signal is produced by the VTR and is supplied via a separate cable to the change-over switch, which, typically, is disposed in the time base corrector. However, this additional cable, as well as the separate change-over control signal, may be undesired and, moreover, may result in erroneous operation of the change-over switch due to interference, noise and the like.

OBJECTS OF THE INVENTION

Therefore, it is an object of the present invention to provide improved apparatus of the aforenoted type which avoids the difficulties and disadvantages mentioned above.

Another object of this invention is to provide apparatus for controlling such a change-over switch which does not require an additional cable for carrying a change-over control signal.

A further object of this invention is to provide apparatus for producing a proper phase-synchronized reference synchronizing signal in a system of the aforenoted type.

An additional object of this invention is to provide apparatus, for use in a video signal reproducing system of the type having at least two rotary reproducing heads, to generate a phase-synchronized reference synchronizing signal regardless of the particular reproducing head which is selected for operation.

Another object of this invention is to provide apparatus for synchronizing the time base error correcting operation of a time base corrector which is used in combination with a video signal reproducing device of the type having at least two spaced-apart reproducing heads, regardless of which of these heads is used to reproduce video signals.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for use in a video signal reproducing system of the type having first and second spaced-apart reproducing transducers for reproducing video and vertical synchronizing signals from record tracks on a record medium, which system also has means for producing a reference synchronizing signal which is in phase synchronism with the vertical synchronizing signal reproduced by the first transducer, this apparatus being adapted to produce a substantially phase-synchronized reference synchronizing signal regardless of the particular transducer which is used. The apparatus comprises a delay circuit for delaying the produced reference synchronizing signal by an amount corresponding to the spaced-apart relationship between the transducers, and for supplying the delayed as well as the undelayed reference synchronizing signals to respective inputs of a selecting circuit. A detector detects the phase relationship between the reproduced vertical synchronizing signal and the reference synchronizing signal and, based upon this detected phase relationship, controls the selecting circuit to supply either the delayed or undelayed reference synchronizing signal. In one embodiment, the reference synchronizing signal which is supplied by the selecting circuit is applied to a time base corrector to synchronize the operation of the latter.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
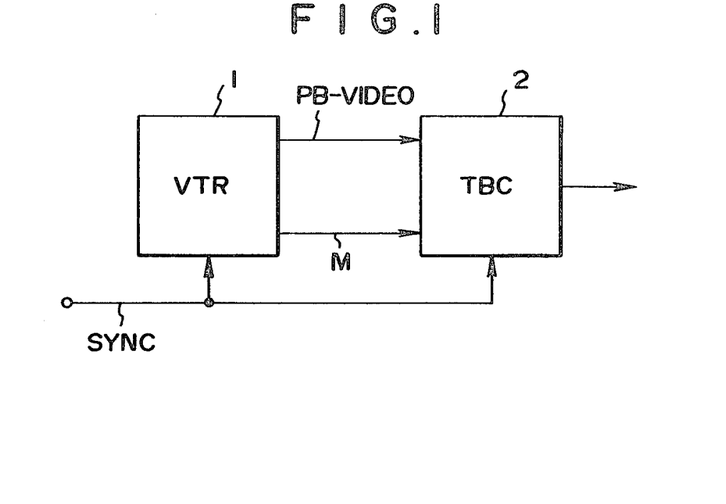
FIG. 1 is a block diagram of a video signal reproducing system in which the present invention finds ready application.

Referring now to the drawings, wherein like reference numerals are used throughout, FIG. 1 is a block diagram representing a typical video reproducing system in which the present invention finds ready application. This system includes a VTR 1 and time base corrector 2. Typically, the VTR is of the type described above, such as a so-called helical scan VTR having a main reproducing head and a monitor or dynamic tracking head, the latter heads being referred to herein as an additional head. Typically, the main and additional heads are rotary heads which are angularly displaced from each other on the order of about 120°. As the main or additional head scans the record tracks on the magnetic tape, the scanning head reproduces the video signals therefrom, these reproduced video signals being referred to as the PB-VIDEO signals. Such PB-VIDEO signals are supplied to time base corrector 2, wherein they are subjected to a time base error correction operation. Since VTR 1 and time base corrector 2 are conventional, further description of these devices is not provided.

In addition, the aforementioned reference synchronizing signal, referred to in FIG. 1 as the "SYNC" signal, is supplied to VTR 1 and to time base corrector 2 during the video signal reproducing operation. It is this SYNC signal which is used to synchronize the operation of the time base corrector so that, for example, the appropriate line of video signals is read out therefrom at the proper time. This SYNC signal also synchronizes the scanning operation of the reproducing heads, or transducers, during the video signal reproducing operation.

In addition to the PB-VIDEO and SYNC signals supplied to time base corrector 2, FIG. 1 represents that a mode change-over signal, referred to as the M signal, is supplied to the time base corrector, representing the particular head which is used to reproduce the video signals. As mentioned above, when the main reproducing head is in operation, the SYNC signal and the reproduced vertical synchronizing signal exhibit a predetermined phase synchronized relationship. However, when the additional head is selected for operation, this phase synchronized relationship does not obtain. More particularly, the SYNC signal is out-of-phase with the vertical synchronizing signal reproduced by the additional head by an amount which corresponds to the angular phase displacement between the main and additional heads. In the example described herein, when the additional head is selected for operation, the SYNC signal and the reproduced vertical synchronzing signal exhibit a 120° phase displacement therebetween. Consequently, the SYNC signal must be delayed by a corresponding amount, that is, by 120°, such that the proper phase synchronized relationship is restored and, thus, time base corrector 2 operates in a proper synchronous mode. The mode change-over signal M is supplied from VTR 1 to time base corrector 2 when the additional head is selected for operation. In response to this mode change-over signal, a suitable delay circuit disposed within time base corrector 2 is effective to produce the appropriate delayed signal. However, as is apparent from FIG. 1, a separate cable must extend between the VTR and the time base corrector in order to supply this mode change-over signal to the time base corrector at the appropriate time. This separate cable, as well as the necessity for this separately supplied mode change-over signal, is undesired. In accordance with one aspect of the present invention, a comparable mode change-over signal is produced automatically by circuitry, to be described, within time base corrector 2. That is, the present invention eliminates the necessity for providing a separate cable and a separate mode change-over signal from the VTR to the time base corrector. Instead, selection of the delayed SYNC signal is obtained automatically, whenever the additional head is selected for operation. Thus, as will be described, the present invention produces a proper phase-synchronized SYNC signal, referred to below as the reference synchronizing signal, regardless of the particular head which is used by the VTR to reproduce video signals.

Figure 2:
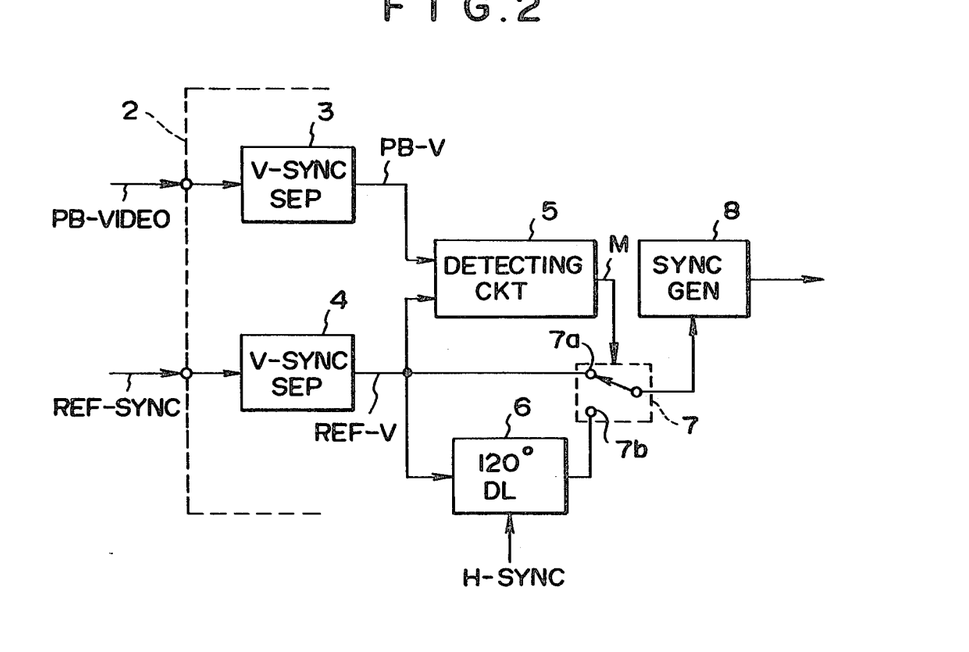
FIG. 2 is a block diagram of an embodiment of the present invention.

A block diagram of the appropriate circuitry which is provided in time base corrector 2 to produce the phase-synchronized reference synchronizing signal is illustrated in FIG. 2. This circuitry is comprised of a vertical synchronizing separator circuit 3, a reference synchronizing signal separator circuit 4, a detecting circuit 5, a delay circuit 6, a switching circuit 7 and a synchronizing generator 8. These elements are included within a broken block 2, the latter representing the time base corrector.

Vertical synchronizing separator circuit 3 may comprise a conventional synchronizing separator which is adapted to separate the reproduced vertical synchronizing signal, represented in FIG. 2 as the signal PB-V, from the reproduced video signal PB-VIDEO. It is recalled that the video signal PB-VIDEO is reproduced from the magnetic tape by the main or additional heads, or transducers, in conventional manner. The vertical synchronizing signal, which is included within these reproduced video signals, is detected and separated by vertical synchronizing signal separator circuit 3. This reproduced vertical synchronizing signal PB-V is supplied to one input of detecting circuit 5.

As mentioned above, the reference synchronizing signal, represented in FIG. 2 as the signal "REF-SYNC", may comprise the reproduced control pulses, reproduced from the control track normally recorded longitudinally on the magnetic tape, or it may comprise the head position pulses which represent when the main and/or additional head rotates into predetermined position, or it may be derived from a combination of the control and head position pulses. The reference synchronizing signal may be mixed, combined or otherwise superimposed with additional signals; and reference synchronizing signal separator circuit 4 serves to separate this reference synchronizing signal REF-SYNC from such other signals. It is appreciated that the reference sychronizing signal has a frequency which is synchronized with the vertical synchronizing frequency and, for convenience, the separated reference synchronizing signal is represented, in FIG. 2, as the signal "REF-V". Nevertheless, in the present discussion, this signal REF-V is referred to herein as the reference synchronizing signal. The separated reference synchronizing signal is supplied from reference synchronizing signal separator circuit 4 to detecting circuit 5, delay circuit 6 and switching circuit 7.

Detecting circuit 5 is adapted to detect whether the reproduced vertical synchronizing signal PB-V is reproduced by the main head, or transducer, or by the additional head, or transducer. This is, detecting circuit 5 functions to detect when the main and additional heads, respectively, are used in a reproducing operation. This determination is achieved by sensing the phase relationship between the reproduced vertical synchronizing signal PB-V and the separated reference synchronizing signal REF-V. It is recalled that, when the main head is selected for a reproducing operation, the vertical synchronizing signal reproduced thereby is in predetermined phase synchronism with the reference synchronizing signal. For example, these signals exhibit substantial phase coincidence. However, because of the phase displacement of the additional head from the main head, when the additional head is selected for a reproducing operation, the aforementioned phase relationship between the reproduced vertical synchronizing signal and the reference synchronizing signal no longer obtains. More particularly, the vertical synchronizing signal which is reproduced by the additional head is out-of-phase with the reference synchronizing signal. For the example wherein the additional head is spaced apart from the main head by 120°, the vertical synchronizing signal which is reproduced by this additional head is delayed with respect to the reference synchronizing signal by 120°. Detecting circuit 5 is adapted to detect whether the reproduced vertical synchronizing signal is in phase with the reference synchronizing signal, as when the vertical synchronizing signal is reproduced by the main head, or whether the reproduced vertical synchronizing signal is out-of-phase (e.g. by 120°) with respect to the reference synchronizing signal, as when the vertical synchronizing signal is reproduced by the additional head. Two embodiments of detecting circuit 5 are described below with respect to FIGS. 3 and 5. As will also be described, the detecting circuit produces a mode change-over signal M which represents whether the main or additional head has been selected for reproducing the video signals. This mode change-over signal is a logic "1" when detecting circuit 5 senses that the video signals are being reproduced by the main head; and the mode change-over signal is a logic "0" when the detecting circuit senses that the video signals are being reproduced by the additional head. This mode change-over signal is supplied as a control signal to switching circuit 7.

Delay circuit 6 is coupled to receive the separated reference synchronizing signal REF-V, and is adapted to impart a predetermined delay of, for example, 120°, to this reference synchronizing signal. Delay circuit 6 thus may comprise a conventional delaying circuit, such as a delay line. In a preferred embodiment thereof, delay circuit 6 comprises a counter which is reset to an initial count in response to the separated reference synchronizing signal REF-V supplied thereto, and then counts horizontal synchronizing signals (represented in FIG. 2 as the signal "H-SYNC"), the latter being separated by a typical horizontal synchronizing separator circuit. It is appreciated that a predetermined number of horizontal synchronizing signals are produced during a time period corresponding to a phase displacement of 120°. Thus, the counter which comprises delay circuit 6 is adapted to count this predetermined number of horizontal synchronizing signals and to produce an output, or delayed reference synchronizing signal, when this predetermined count is attained. This output, which appears as a pulse, thus is a delayed version of the reference synchronizing signal, and this delayed reference synchronizing signal is supplied to an input 7b of switching circuit 7. As illustrated in FIG. 2, the undelayed reference synchronizing signal is supplied directly by reference synchronizing signal separator circuit 4 to an input 7a of the switching circuit.

Switching circuit 7 is illustratively represented herein as an electro-mechanical switch having a movable contact connected to the output thereof, this movable contact being selectively coupled to either of its inputs 7a and 7b. More particularly, the output of switching circuit 7 is coupled to input 7a when mode change-over signal M is a "1"; and this output is coupled to input 7b when the mode change-over signal is a "0". Thus, depending upon the logic state of the mode change-over signal M, switching circuit 7 functions to select either the undelayed reference synchronizing signal, or the delayed reference synchronizing signal. The selected reference synchronizing signal is supplied by switching circuit 7 to synchronizing generator 8. This synchronizing generator serves to produce a read synchronizing signal in response to the reference synchronizing signals supplied thereto, and also to produce a read clock signal that is phase-synchronized with this supplied reference synchronizing signal. The read synchronizing signal is utilized by time base corrector 2 to initiate a read-out operation of the video signals which are stored therein, and the read clock signal is utilized by the time base corrector in this read-out operation. Since the read-out operation of a typical time base corrector is known to those of ordinary skill in the art, further description thereof is not provided. Suffice it to say that synchronizing generator 8 is responsive to the reference synchronizing signal supplied thereto so as to synchronize the operation of time base corrector 2.

It will be appreciated that, when the main head of VTR 1 is used to reproduce the video signals, detecting circuit 5 senses that the reproduced vertical synchronizing signal and the reference synchronizing signal exhibit their predetermined phase relationship so as to supply the mode change-over signal as a "1". Consequently, switching circuit 7 selects the undelayed reference synchronizing signal for application to synchronizing generator 8. Conversely, when the additional head is used in VTR 1 to reproduce the video signals, detecting circuit 5 senses that the reproduced vertical synchronizing signal now is out-of-phase with the reference synchronizing signal. Moreover, the detecting circuit senses that the reproduced vertical synchronizing signal is 120° out-of-phase with the reference synchronizing signal so as to supply switching circuit 7 with a "0" mode change-over signal. Consequently, the switching circuit now selects the delayed version of the reference synchronizing signal for application to synchronizing generator 8. Since the reference synchronizing signal now is delayed by 120°, it is seen that the predetermined phase relationship between the vertical and reference synchronizing signals is restored. Hence, synchronizing generator 8 controls the operation of time base corrector 2 in proper synchronism with the video signals which now are reproduced by the additional head.

Figure 3:
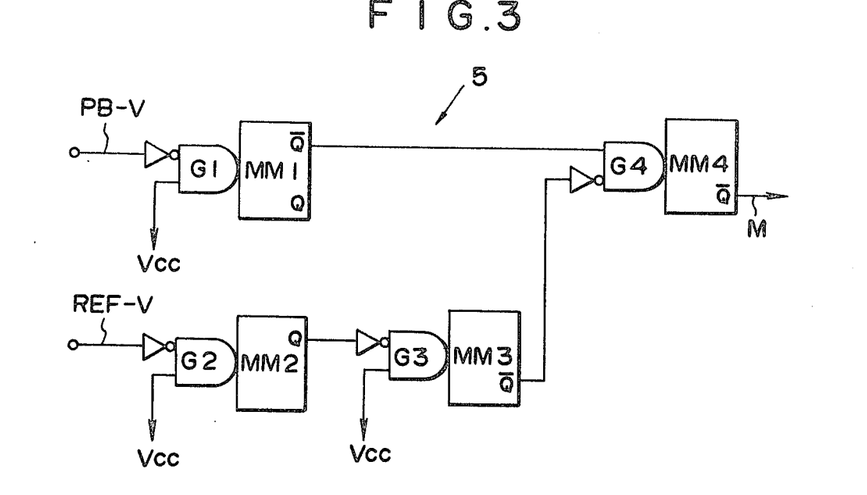
FIG. 3 is a logic diagram of one embodiment of the detecting circuit which is used with the present invention.

Referring now to FIG. 3, there is illustrated one embodiment of detecting circuit 5. This embodiment is comprised of a plurality of gated monostable multivibrators, including monostable multivibrator MM1, having an input gate G1, the latter being, in this example, an AND gate which functions to trigger the monostable multivibrator when a binary "1" is supplied to its input thereof. Gate G1 has one input coupled via a conventional logic inverter to an input terminal to receive the separated, reproduced vertical synchronizing signal PB-V. The other input of gate G1 is connected to receive a constant reference voltage level $V_{cc}$, which is the equivalent of a binary "1". It is appreciated that gate G1 serves to trigger monostable multivibrator MM1 in response to a negative-going vertical synchronizing signal PB-V.

Monostable multivibrator MM1 normally is disposed in its stable condition, which is represented by a binary "1" at its $\overline{Q}$ output and, concurrently, a binary "0" at its Q output. When triggered, the monostable multivibrator is changed over to its quasi-stable state, which is represented as a binary "0" at its Q output and a binary "1" at its Q output. As is conventional, the monostable multivibrator exhibits a quasi-stable time-out period, which is the period that the monostable multivibrator remains in its quasi-stable state. At the completion of this time-out period, monostable multivibrator MM1 returns from its quasi-stable state to its stable state. In the present example, the quasi-stable time-out period of monostable multivibrator MM1 is slightly less than the vertical synchronizing period. That is, if monostable multivibrator MM1 is triggered to its quasi-stable state in response to a separated vertical synchronizing signal PB-V, the monostable multivibrator returns to its stable state just prior to the occurrence of the next-following vertical synchronizing signal.

Gated monostable multivibrator MM2 is similar to aforedescribed monostable multivibrator MM1, and includes a gate circuit G2 having one input coupled via an inverter to an input terminal to receive the separated reference synchronizing signal REF-V, and another input connected to receive the binary "1" constant voltage level $V_{cc}$. Monostable multivibrator MM2 is triggered to its quasi-stable state in response to a positive-going transition produced at the output of gate G2. This monostable multivibrator remains in its quasi-stable state for its quasi-stable time-out period, which period is less than the quasi-stable time-out period of monostable multivibrator MM1. For a reason soon to be described, the quasi-stable time-out period of monostable multivibrator MM2 corresponds to a phase delay on the order of about 110°.

The Q output of monostable multivibrator MM2 is coupled, via an inverter, to one input of a gate circuit G3, this gate circuit being used to trigger monostable multivibrator MM3. The other input of gate circuit G3 is coupled to receive the binary "1" constant voltage level $V_{cc}$. It is appreciated that, in the illustrated circuit, gate G3 triggers monostable multivibrator MM3 to its quasi-stable state in response to the return of monostable multivibrator MM2 to its stable state. Monostable multivibrator MM3 exhibits a quasi-stable time-out period that corresponds to a phase delay on the order of about 20°.

The $\bar{Q}$ output of monostable multivibrator MM3 is coupled, via an inverter, to one input of a gate G4, the other input of this gate being coupled to the $\bar{Q}$ output of monostable multivibrator MM1. Gate G4 serves to trigger monostable multivibrator MM4 whose $\bar{Q}$ output is utilized to produce the mode change-over signal M.

Figure 4A:
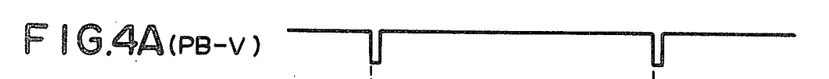
FIGS. 4A-4F are timing diagrams which are useful in understanding the operation of the detecting circuit shown in FIG. 3.
Figure 4B:
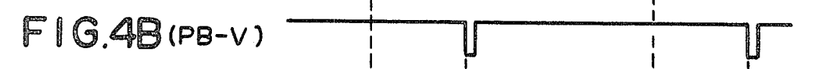
Figure 4C:
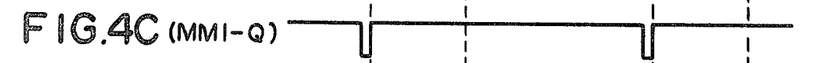

The manner in which detecting circuit 5, illustrated in FIG. 3, operates now will be described with reference to the timing diagrams illustrated in FIGS. 4A–4F. Let it be assumed that the main head of VTR 1 has been selected for reproducing the video signals from magnetic tape. The separated vertical synchronizing signals PB-V shown in FIG. 4A thus are supplied to the inverter input of gate G1. The negative-going transition of this vertical synchronizing signal is inverted and supplied by gate G1 to trigger monostable multivibrator MM1. Accordingly, and as shown in FIG. 4C, monostable multivibrator MM1 is triggered to its quasi-stable state, resulting in a binary "1" at its Q output. The complement of the signal shown in FIG. 4C is provided at the $\bar{Q}$ output of monostable multivibrator MM1, and this complementary output is supplied to gate circuit G4. It is seen, from FIG. 4C, that monostable multivibrator MM1 remains in its quasi-stable state for a period which is just less than the vertical synchronizing period shown in FIG. 4A.

Figure 4D:
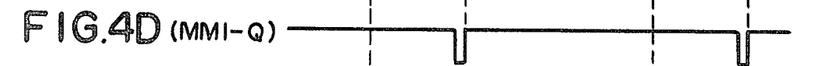
Figure 4E:
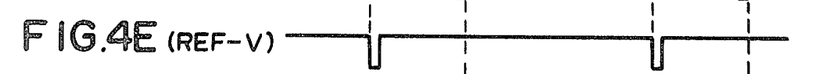

The reference synchronizing signal REF-V, shown in FIG. 4E, is supplied to the inverter input of gate G2. From FIGS. 4A and 4E, it is seen that the vertical and reference synchronizing signals are in substantial phase coincidence when the main head of VTR 1 is used in a signal reproducing operation. The negative-going transition of the reference synchronizing signal REF-V (FIG. 4E) is inverted and supplied by gate circuit G2 to trigger monostable multivibrator MM2. Thus, a pulse is produced at the Q output of this monostable multivibrator, this pulse having a duration determined by the quasi-stable time-out period of the monostable multivibrator. At the termination of this pulse, that is, when monostable multivibrator MM2 returns to its stable state, the negative transition thus produced at the Q output thereof is inverted and supplied by gate circuit G3 to trigger monostable multivibrator MM3. Monostable multivibrator MM3 thus is triggered to its quasi-stable state, producing the negative-going pulse shown in FIG. 4F at the $\bar{Q}$ output thereof. The duration of this negative-going pulse (FIG. 4F) is, of course, determined by the quasi-stable time-out period of monostable multivibrator MM3.

The pulse produced at the $\bar{Q}$ output of monostable multivibrator MM3 serves as a so-called window pulse. As mentioned above, this window pulse exhibits a duration corresponding to a phase displacement of about 20°, and is initiated at a time which corresponds to a phase displacement of about 110° from the commencement of the reference synchronizing signal REF-V. That is, this window pulse is substantially centered at a phase displacement of 120°±10° relative to the reference synchronizing signal REF-V. In view of the phase coincidence of the vertical synchronizing signal PB-V with this reference synchronizing signal, it also is appreciated that the window pulse (FIG. 4F) is substantially centered at a time which is phase displaced by 120° from the vertical synchronizing signal.

Figure 4F:
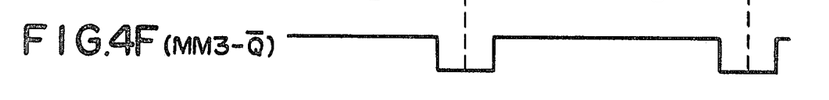

The purpose of the window pulse shown in FIG. 4F is to condition gate circuit G4 to trigger monostable multivibrator MM4 in the event that a vertical synchronizing signal is produced during the duration of this window pulse. However, in the example described herein, the window pulse is phase-displaced from the vertical synchronizing signal PB-V by 120°. Thus, although the window pulse conditions gate circuit G4 to trigger monostable multivibrator MM4 in the event that a vertical synchronizing signal PB-V occurs during this window pulse duration, this occurrence is not present. Thus, when the main head is used to reproduce video signals, monostable multivibrator MM4 is not triggered. Consequently, this monostable multivibrator produces a binary "1" at its $\bar{Q}$ output. This is the mode change-over signal M and, since it is a binary "1", switching circuit 7 (FIG. 2) supplies the undelayed reference synchronizing signal to synchronizing generator 8.

Now, let it be assumed that the additional head is used to reproduce video signals. Consequently, the reproduced vertical synchronizing signal PB-V is produced at a time which is phase-displaced by 120° from the time-of-occurrence of the vertical synchronizing signal reproduced by the main head. FIG. 4B illustrates the vertical synchronizing signal PB-V which is reproduced by the additional head. A comparison of FIGS. 4A and 4B illustrates this 120° phase displacement. Now, monostable multivibrator MM1 is triggered in response to the vertical synchronizing signal PB-V, shown in FIG. 4B, resulting in the signal at its Q output shown in FIG. 4D. The duration of this negative-going pulse of FIG. 4D is seen to be equal to the difference between the vertical synchronizing period and the quasi-stable time-out period of monostable multivibrator MM1.

Of course, the reference synchronizing signal is produced, as shown in FIG. 4E, regardless of the particular head which is selected for reproducing the video signal. Therefore, even though the additional head has been selected for the reproducing operation, monostable multivibrator MM3 nevertheless generates the window pulse shown in FIG. 4F.

It is seen that the vertical synchronizing signal PB-V, now reproduced from the magnetic tape by the additional head, as well as the negative pulse produced at the $\bar{Q}$ output of monostable multivibrator MM1 in response to this vertical synchronizing signal, occurs during the duration of the window pulse. This is because the vertical synchronizing signal now reproduced by the additional head is phase-displaced by about 120° from the vertical synchronizing signal which is reproduced by the main head. Gate circuit G4 detects the coincidence between the window pulse, shown in FIG. 4F, and the pulse produced at the $\bar{Q}$ output of monostable multivibrator MM1. This coincidence is due to the out-of-phase relationship between the vertical synchronizing signal PB-V (FIG. 4B) reproduced by the additional head and the reference synchronizing signal REF-V (FIG. 4E). More particularly, the window pulse of FIG. 4F conditions gate G4 to trigger monostable multivibrator MM4 in response to the pulse produced at the $\bar{Q}$ output of monostable multivibrator MM1. Monostable multivibrator MM4 thus is triggered to its quasistable state, resulting in a binary "0" at the $\bar{Q}$ output thereof. This binary "0" is supplied as the mode change-over signal M to switching circuit 7. Thus, the embodiment of detecting circuit 5, shown in FIG. 3, detects when the additional head is used to reproduce the video signals, and controls switching circuit 7 to select the delayed version of reference synchronizing signal REF-V for application to synchronizing generator 8. It is appreciated, from FIG. 4E, that if the reference synchronizing signal REF-V is delayed by 120°, it is brought into substantial phase coincidence with the vertical synchronizing signal PB-V (FIG. 4B) which now is reproduced by the additional head. Thus, the detecting circuit serves to determine when it is appropriate to delay the reference synchronizing signal.

Monostable multivibrator MM4 is a retriggerable monostable multivibrator whose quasi-stable time-out period is equal to a plurality of vertical synchronizing periods. More particularly, the quasi-stable time-out period of this retriggerable monostable multivibrator is equal to $3V + \alpha$, wherein V is equal to a vertical synchronizing period, and $\alpha$ is a time period which is less than a vertical synchronizing period. Therefore, if drop-out occurs so that the vertical synchronizing signal PB-V is not reproduced, or if the signal level of the reproduced vertical synchronizing signal is less than a detectable level, the mode change-over signal M nevertheless remains at its binary "0" level for at least three vertical synchronizing periods. Hence, it is appreciated that monostable multivibrator MM4 is triggered to, and remains in its quasi-stable state only when detecting circuit 5 detects that the reproduced vertical synchronizing signal PB-V is phase-displaced by $120° \pm 10°$ from the reference synchronizing signal REF-V. This condition occurs when the additional head is selected for a reproducing operation. That is, when the additional head is utilized, the reproduced vertical synchronizing signal is phase-displaced by about 120° from the vertical synchronizing signal which normally is reproduced by the main head. As discussed above, detecting circuit 5 detects this condition to control switching circuit 7 accordingly. When the main head is selected for a reproducing operation, the reproduced vertical synchronizing signal PB-V exhibits its normal phase relationship (e.g. phase coincidence) with the reference synchronizing signal REF-V; and the monostable multivibrator MM4 is not triggered.

From the foregoing description, it is seen that the detecting circuit shown in FIG. 3 detects the phase relationship between the reproduced vertical synchronizing signal PB-V and the reference synchronizing signal REF-V. The window pulse produced by monostable multivibrator MM3 is substantially centered on the expected time of occurrence of the vertical synchronizing signal PB-V (FIG. 4B) reproduced by the additional head. Gate circuit G4 is conditioned by the window pulse so as to trigger monostable multivibrator MM4 if the vertical synchronizing signal PB-V is reproduced by the additional head. Of course, this monostable multivibrator is not triggered if the vertical synchronizing signal is reproduced by the main head.

It is seen that the pulses produced by monostable multivibrator MM1 (FIGS. 4C and 4D) in response to the respective vertical synchronizing signals PB-V are of similar pulse duration, and lead the reproduced vertical synchronizing signals. It is preferred to supply gate circuit G4 with the pulses produced by the monostable multivibrator rather than the actual reproduced vertical synchronizing signals because of improved noise immunity. That is, vertical synchronizing signal separator circuit 3 (FIG. 2) may supply a negative-going noise pulse to detecting circuit 5, which noise pulse is erroneously interpreted as a vertical synchronizing signal. Such a noise pulse, if it occurs during the window pulse duration, may erroneously trigger monostable multivibrator MM4. However, by using the pulses produced by monostable multivibrator MM1, the presence of such a noise pulse at the output of the vertical synchronizing signal separator circuit has no affect and, thus, will not falsely trigger monostable multivibrator MM4.

Figure 5:
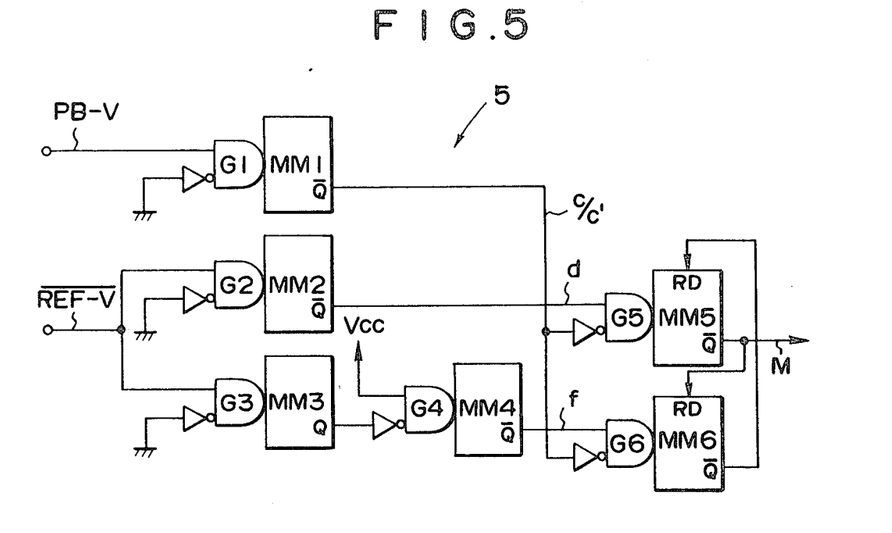
FIG. 5 is a logic diagram of another embodiment of the detecting circuit which is used with the present invention.

Yet another embodiment of detecting circuit 5 is illustrated in FIG. 5. In this embodiment, two separate window pulses are generated in response to the reference synchronizing signal, these window pulses being substantially centered on the expected times of occurrence of the vertical synchronizing signal reproduced by the main and additional heads, respectively. As before, these window pulses are used to detect the phase relationship of the reproduced vertical synchronizing signal, and thus determine whether this signal is reproduced by the main or the additional head.

As illustrated, detecting circuit 5 in the embodiment of FIG. 5, is comprised of gated monostable multivibrators MM1-MM6, each of these monostable multivibrators having an input gate circuit G1-G6, respectively, connected thereto. Gate circuit G1 has one input connected to receive the reproduced vertical synchronizing signal PB-V, and another input connected via an inverter to a reference potential, such as ground, the latter supplying a binary "0" voltage level. The $\bar{Q}$ output of monostable multivibrator MM1 is supplied to one input of each of gate circuits G5 and G6 via respective inverters.

Gate circuit G2 has one input connected via an inverter to a source of binary "0" voltage level, such as ground, and another input connected to receive the inverted version of the reference synchronizing signal, represented in FIG. 5 as the signal "$\overline{\text{REF-V}}$". Gate circuit G2 is adapted to trigger monostable multivibrator MM2 whose $\bar{Q}$ output is coupled to the other input of gate circuit G5.

Similarly, the inverted reference synchronizing signal $\overline{\text{REF-V}}$ is supplied to one input of gate circuit G3, the other input thereof being coupled to a source of binary "0" voltage level via an inverter. Gate circuit G3 is adapted to trigger monostable multivibrator MM3 whose quasi-stable time-out duration corresponds to a phase displacement on the order of about 115°. The Q output of this monostable multivibrator is coupled, via an inverter, to one input of gate circuit G4, the other input thereof being coupled to a source of binary "1" voltage level, such as reference potential $V_{cc}$. This gate circuit is adapted to trigger monostable multivibrator MM4 whose $\bar{Q}$ output is coupled to the other input of gate circuit G6.

Monostable multivibrators MM2 and MM4 exhibit similar quasi-stable time-out durations corresponding to a phase displacement on the order of about 10°. These monostable multivibrators, when triggered, generate the aforementioned respective window pulses.

Monostable multivibrators MM5 and MM6 are adapted to be triggered by gate circuits G5 and G6, respectively. These monostable multivibrators are retriggerable, and each exhibits a quasi-stable time-out period equal to at least a plurality of vertical synchronizing periods. For example, the quasi-stable time-out periods of these monostable multivibrators may be equal to $3V + \alpha$, that is, the quasi-stable time-out period of aforedescribed monostable multivibrator MM4, shown in FIG. 3. Each of monostable multivibrators MM5 and MM6 also is provided with a so-called direct reset input RD which, when supplied with a binary "0" maintains the monostable multivibrator in its stable, or reset, state. That is, when a binary "0" is supplied to its direct reset input RD, the monostable multivibrator is not responsive to a trigger pulse supplied thereto by its respective gate circuit. However, when its direct reset input RD is supplied with a binary "1", the monostable multivibrator may be triggered to its quasi-stable stable. As illustrated in FIG. 5, the $\bar{Q}$ output of monostable multivibrator MM5 is coupled to the direct reset input RD of monostable multivibrator MM6; and, similarly, the $\bar{Q}$ output of monostable multivibrator MM6 is coupled to the direct reset input RD of monostable multivibrator MM5. Furthermore, the $\bar{Q}$ output of monostable multivibrator MM5 is used to produce the mode change-over signal M.

Figure 6A:
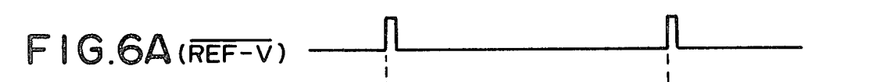
FIGS. 6A-6H are timing diagrams which are useful in understanding the operation of the embodiment shown in FIG. 5.
Figure 6B:
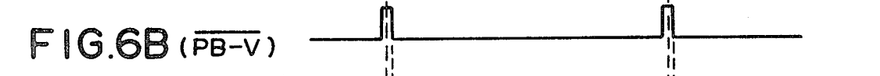
Figure 6C:
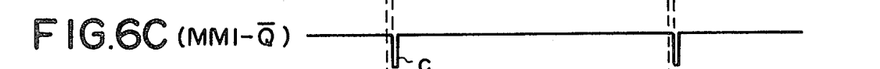
Figure 6D:
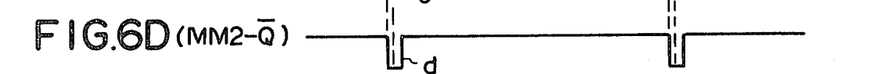

The manner in which the embodiment illustrated in FIG. 5 operates now will be described. The inverted reference synchronizing signal $\overline{REF\text{-}V}$ is illustrated in FIG. 6A. It is recalled that this reference synchronizing signal is produced, in the illustrated phase relationship, regardless of whether the main or additional head is selected for the signal reproducing operation. Since gate circuits G2 and G3 always are enabled by the binary "1" supplied to each by the illustrated inverters, the inverted reference synchronizing signal $\overline{REF\text{-}V}$ serves to trigger monostable multivibrators MM2 and MM3 in response to the positive-going transition therein. Accordingly, monostable multivibrator MM2 produces, at its $\bar{Q}$ output, the window pulse d illustrated in FIG. 6D. The quasi-stable time-out period of monostable multivibrator MM2 corresponds to a phase displacement of about 10°. Hence, the duration of the window pulse d, shown in FIG. 6D, is equal to a phase duration of 10°. This window pulse d is supplied to gate circuit G5 to inhibit this gate circuit to trigger monostable multivibrator MM5 in the event that monostable multivibrator MM1 is triggered in response to a vertical synchronizing signal PB-V reproduced by the main head.

Figure 6E:
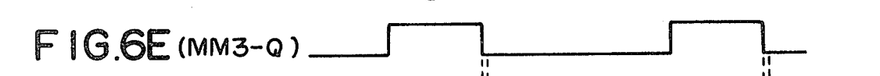
Figure 6F:
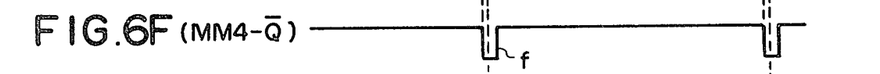

As shown in FIG. 5, the positive-going transition of the inverted reference sychronizing signal $\overline{REF\text{-}V}$ is supplied by gate circuit G3 to trigger monostable multivibrator MM3. The duration of the pulse produced at the Q output of monostable multivibrator MM3 is seen to correspond to a phase displacement on the order of about 115°. At the termination of this pulse (FIG. 6E) that is, at the negative-going transition in the pulse produced at the Q output of monostable multivibrator MM3, gate circuit G4 triggers monostable multivibrator MM4 to produce the window pulse f, shown in FIG. 6F. The quasi-stable time-out period of monostable multivibrator MM4 corresponds to a phase displacement of about 10° and, therefore, the duration of window pulse f is within the range of from 115° to 125°. That is, this window pulse f is substantially centered on the expected time of occurrence of the vertical synchronizing signal reproduced by the additional head. Window pulse f is supplied to inhibit gate circuit G6 to respond to a pulse produced by monostable multivibrator MM1 in the event that this monostable multivibrator is triggered by the vertical synchronizing signal reproduced by the additional head.

Let it be assumed that VTR 1 operates such that the main head reproduces the video signals from the magnetic tape. Accordingly, the vertical synchronizing signal PB-V supplied to gate circuit G1 is in substantial phase coincidence with the reference synchronizing signal. FIG. 6B illustrates the inverted version of the reproduced vertical synchronizing signal $\overline{PB\text{-}V}$. Hence, the negative-going transition in the inverted vertical synchronizing signal $\overline{PB\text{-}V}$ coincides with the positive-going transition in the non-inverted version of the vertical synchronizing signal, thereby triggering monostable multivibrator MM1 to its quasi-stable stable. In the present embodiment, it is assumed that the quasi-stable time-out period of monostable multivibrator MM1 is relatively brief. Thus, when this monostable multivibrator is triggered, its $\bar{Q}$ output is provided with the negative-going pulse c shown in FIG. 6C.

This negative-going pulse c, which represents the occurrence of the reproduced vertical synchronizing signal PB-V, is supplied, via respective inverters, to gate circuits G5 and G6. At the time of occurrence of the pulse c shown in FIG. 6C, gate circuit G5 is inhibited, or disabled, by window pulse d, shown in FIG. 6D. Hence, monostable multivibrator MM5 is not triggered. However, it is seen that, at the time of occurrence of pulse c, gate circuit G6 is enabled by the absence of window pulse f. Hence, when the vertical synchronizing signal is reproduced by the main head, monostable multivibrator MM6 is triggered, whereupon a binary "0" is supplied from its $\bar{Q}$ output to the direct reset input RD of monostable multivibrator MM5. It is recalled that, in response to this binary "0" supplied to its direct reset input, monostable multivibrator MM5 remains in its reset state. Thus, a binary "1" is produced at the $\bar{Q}$ output of this monostable multivibrator, resulting in a mode change-over signal M whose level also is equal to a binary "1". Therefore, switching circuit 7 (FIG. 2) is controlled by this binary "1" mode change-over signal to select the undelayed reference synchronizing signal to be supplied to synchronizing generator 8.

As mentioned above, the quasi-stable time-out periods of monostable multivibrators MM5 and MM6 both are equal to at least a plurality of vertical synchronizing periods and, more particularly, these time-out periods are equal to 3 V+α. Hence, even if drop-out occurs at a reproduced vertical synchronizing signal, or even if the signal level of such a reproduced vertical synchronizing signal is too low, the binary "1" mode change-over signal nevertheless remains for at least three vertical synchronizing periods.

Figure 6G:
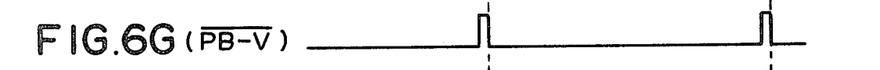
Figure 6H:
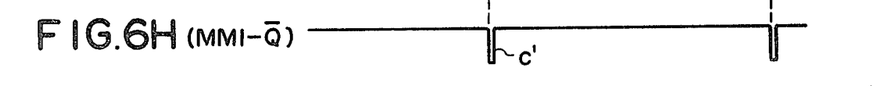

Now, let it be assumed that the additional head of VTR 1 is used for a signal reproducing operation. It is appreciated that, when the additional head is used, the vertical synchronizing signal reproduced thereby is phase delayed by about 120° from the vertical synchronizing signal which is produced by the main head. An inverted version of this phase-delayed reproduced vertical synchronizing signal $\overline{PB\text{-}V}$ is illustrated in FIG. 6G. As before, the negative-going transition of the inverted vertical synchronizing signal corresponds to the positive-going transition of the noninverted vertical synchronizing signal, and monostable multivibrator MM1 is triggered in response thereto. This monostable multivibrator thus produces the negative-going pulse c' at the $\bar{Q}$ output thereof, as shown in FIG. 6H.

At the time of occurrence of the pulse c', window pulse f (FIG. 6F) inhibits gate circuit G6 from responding thereto. However, window pulse d is not present, as shown in FIG. 6D, thus enabling gate circuit G5 to respond to the inverted version of this pulse c' to trigger monostable multivibrator MM5. Consequently, a binary "0" is provided at the $\bar{Q}$ output of monostable multivibrator MM5. This binary "0" is supplied as the mode change-over signal M to switching circuit 7 (FIG. 2). Hence, the switching circuit operates to select the delayed reference synchronizing signal. This delayed reference synchronizing signal is, of course, phase-synchronized with the reproduced vertical synchronizing signal PB-V now reproduced by the additional head.

The binary "0" provided at the $\bar{Q}$ output of monostable multivibrator MM5 also is supplied to the direct reset input RD of monostable multivibrator MM6, thereby maintaining this latter monostable multivibrator in its stable, reset state. Since the quasi-stable time-out period of monostable multivibrator MM5 is equal to about $3 V + \alpha$, it is appreciated that drop-out in the reproduced vertical synchronizing signal, or a signal level that is too low, will not alter the change-over signal M for at least three vertical synchronizing periods.

By supplying a binary "0" to the direct reset input RD of one or the other monostable multivibrator MM5 and MM6, it is seen that this monostable multivibrator is not erroneously triggered to its quasi-stable stable in response to a possible noise pulse that may be produced at the output of its gate circuit. That is, when monostable multivibrator MM5 is in its stable reset state, monostable multivibrator MM6 is in its quasi-stable stable to supply the binary "0" to the direct reset input RD of monostable multivibrator MM5. Even if a noise pulse is produced at the output of gate circuit G5, monostable multivibrator MM5 is immune thereto and remains in its stable, reset state by reason of the binary "0" supplied to its direct reset input. Similarly, when monostable multivibrator MM5 exhibits its quasi-stable set state, monostable multivibrator MM6 is "locked" in its stable, reset state by reason of the binary "0" supplied to its direct reset input RD from the $\bar{Q}$ output of monostable multivibrator MM5. Hence, even if a noise pulse is produced at the output of gate circuit G6, monostable multivibrator MM6 is not triggered to its quasi-stable state and, hence, monostable multivibrator MM5 is not erroneously reset to its stable, reset state. Thus, the embodiment illustrated in FIG. 5 exhibits desirable noise immunity.

While the present invention has been particularly shown and described with reference to certain preferred embodiments, it should be readily apparent to those of ordinary skill in the art that various changes and modifications in form and details may be made without departing from the spirit and scope of the invention. For example, the monostable multivibrators illustrated in FIG. 3 need not be gated monostable multivibrator circuits. More particularly, gate circuits G1-G3 may be omitted. Similarly, in the embodiment of FIG. 5, gate circuits G1-G4 may be omitted. It is preferred, however, that gate circuits G5 and G6 be utilized. Furthermore, if the respective monostable multivibrators are provided with the illustrated gate circuits, it is appreciated that such gate circuits may be conditioned for responding to the various pulse signals supplied thereto either by supplying binary "1" voltage levels thereto, such as the reference potential $V_{cc}$, shown in FIG. 3, or such gate circuits may be enabled by supplying a binary "0" voltage level, such as ground, through inverters to the respective gate circuits, as shown in FIG. 5. Also, where complements of various pulse signals are present, such complements may be used to trigger the respective monostable multivibrators.

It is intended that the appended claims be interpreted as including the foregoing, as well as various other changes and modifications.

What is claimed is:

1. For use in a video signal reproducing system of the type including a video signal reproducing device having first and second rotary reproducing transducers for reproducing video signals, including vertical synchronizing signals, from record tracks on a record medium, said transducers exhibiting a predetermined angular separation therebetween, said device also having means for producing a reference synchronizing signal in phase synchronism with the vertical synchronizing signal reproduced by said first transducer, and a utilization means coupled to said video signal reproducing device, apparatus for producing a substantially phase synchronized reference synchronizing signal, regardless of the particular transducer which is used to reproduce said video signals, for use by said utilization means, comprising switch means having first and second inputs and an output coupled to said utilization means; means for supplying said reference synchronizing signal to said first input; delay means for delaying said reference synchronizing signal by an amount corresponding to said predetermined angular separation between said transducers to apply a delayed reference synchronizing signal to said second input; and switch control means including detecting means for detecting the phase relationship between a vertical synchronizing signal then reproduced by a transducer and said reference synchronizing signal for producing a switch control signal as a function of the detected phase relationship and means for supplying said switch control signal to said switch means to select the particular switch input to which the output thereof is coupled and thereby select the delayed or undelayed reference synchronizing signal for application to said utilization means.

2. The apparatus of claim 1, wherein said detecting means comprises window generating means responsive to said reference synchronizing signal for generating a window pulse of predetermined duration and substantially centered on the expected time of occurrence of the vertical synchronizing signal reproduced by said second transducer, said switch control signal being effective to couple the output of said switch means to said second input thereof if a reproduced vertical synchronizing signal occurs during said window pulse.

3. The apparatus of claim 2 wherein said window generating means comprises first monostable multivibrator means triggered by said reference synchronizing signal to produce a first pulse of given duration; and second monostable multivibrator means triggered by the termination of said first pulse to produce said window pulse.

4. The apparatus of claim 2 wherein said switch control means comprises gate means for sensing the coincidence of said reproduced vertical synchronizing signal and said window pulse; and multivibrator means triggered by said gate means to produce said switch control signal to couple the output of said switch means to said second input thereof.

5. The apparatus of claim 4 wherein said multivibrator means comprises a retriggerable monostable multivibrator having a quasi-stable time-out duration equal to at least a plurality of vertical synchronizing periods.

6. The apparatus of claim 1, wherein said detecting means comprises first and second window generating means responsive to said reference synchronizing signal for generating first and second window pulses of predetermined duration and substantially centered on the expected times of occurrence of the vertical synchronizing signals reproduced by said first and second transducers, respectively; said switch control signal being effective to couple the output of said switch means to said first input thereof if a reproduced vertical synchronizing signal occurs during said first window pulse and to couple the output of said switch means to said second input thereof if a reproduced vertical synchronizing signal occurs during said second window pulse.

7. The apparatus of claim 6 wherein said first window generating means comprises first monostable multivibrator means triggered by said reference synchronizing signal to produce said first window pulse.

8. The apparatus of claim 7 wherein said second window generating means comprises second monostable multivibrator means triggered by said reference synchronizing signal to produce a timing pulse of given duration; and third monostable multivibrator means triggered by the termination of said timing pulse to produce said second window pulse.

9. The apparatus of claim 6 wherein said switch control means comprises pulse generating means responsive to a reproduced vertical synchronizing signal for generating a pulse whose duration is less than said predetermined duration of said window pulses; first and second gate means for sensing the coincidence of said last-mentioned pulse and said first and second window pulses, respectively; and multivibrator means triggered by said first and second gate means to produce first and second switch control signals to couple the output of said switch means to said first and second inputs thereof, respectively.

10. The apparatus of claim 9 wherein said multivibrator means comprises first and second retriggerable monostable multivibrators, each having a quasi-stable time-out duration equal to at least a plurality of vertical synchronizing periods and each having a direct reset input, said first retriggerable monostable multivibrator being triggered to its quasi-stable state by said first gate means and said second retriggerable monostable multivibrator being triggered to its quasi-stable state by said second gate means, and each retriggerable monostable multivibrator applying a reset signal to the direct reset input of the other when in its quasi-stable state.

11. Apparatus for synchronizing the time base error correcting operation of a time base corrector used in combination with a video signal reproducing device, the latter being of the type having first and second spaced apart reproducing transducers for reproducing video and vertical synchronizing signals from record tracks on a record medium and also having means for producing a reference synchronizing signal in phase synchronism with the vertical synchronizing signal reproduced by said first transducer, said apparatus comprising means for providing said reference synchronizing signal; delay means for delaying said reference synchronizing signal by an amount corresponding to the spaced apart relationship of said transducers to produce a delayed reference synchronizing signal; detecting means for detecting if said reference synchronizing signal is phase synchronized with the vertical synchronizing signal then reproduced by one of said transducers; and selecting means for selecting the undelayed reference synchronizing signal to be supplied to said time base corrector if said reference synchronizing signal is phase synchronized with said reproduced vertical synchronizing signal and for selecting the delayed reference synchronizing signal to be supplied to said time base corrector if said reference synchronizing signal is not phase synchronized with said reproduced vertical synchronizing signal.

12. The apparatus of claim 11 wherein said detecting means comprises pulse generating means responsive to said reference synchronizing signal for generating a delayed pulse substantially centered on the expected time of occurrence of the vertical synchronizing signal reproduced by said second transducer; coincidence means for sensing the coincidence of said delayed pulse and said reproduced vertical synchronizing signal; and means responsive to said coincidence means for controlling said selecting means to select the delayed reference synchronizing signal.

13. The apparatus of claim 12 wherein said generated pulse is delayed by an amount that is a function of the delay of said delay means.

* * * * *